United States Patent

Latker et al.

[15] 3,644,831

[45] Feb. 22, 1972

[54] MODULATION SYSTEM

[72] Inventors: Alex Latker; Johannes J. Vandegraaf, both of Lynchburg, Va.

[73] Assignee: General Electric Company

[22] Filed: Oct. 9, 1967

[21] Appl. No.: 685,222

Related U.S. Application Data

[63] Continuation of Ser. No. 423,093, Jan. 4, 1965, abandoned.

[52] U.S. Cl. ..............................325/137, 325/145, 325/147, 325/153, 332/16

[51] Int. Cl. ........................................H04b 1/68, H04b 1/04

[58] Field of Search ....................325/137, 145, 147, 148, 45, 325/46, 49, 50; 332/10, 22, 23, 23 A, 45, 16, 17, 18, 19

[56] References Cited

UNITED STATES PATENTS

| | | | |
|---|---|---|---|
| 2,098,307 | 11/1937 | Purington | 332/45 X |
| 2,246,164 | 6/1941 | Crosby | 325/145 X |
| 2,323,698 | 7/1943 | Armstrong | 325/146 X |
| 2,761,105 | 8/1956 | Crosby | 325/137 X |
| 2,989,707 | 6/1961 | Kahn | 332/45 |
| 2,998,491 | 8/1961 | Marcou et al. | 325/50 X |
| 1,941,068 | 12/1933 | Armstrong | 325/45 |

*Primary Examiner*—Benedict V. Safourek
*Attorney*—I. David Blumenfeld, Frank L. Neuhauser and Oscar B. Waddell

[57] ABSTRACT

A narrow band transmitter utilizing a modulation technique in which a variable frequency oscillator is constrained to follow the frequency variations of a heavily limited single sideband signal to produce a constant-amplitude, narrow band output signal. The audio intelligence is applied to a single sideband modulator to produce a single sideband signal, which is then heavily limited to remove the amplitude information, with the intelligence being retained in the zero crossings of the limited signal. The limited S.S.B. signal controls a phase-locked oscillator loop, which varies the frequency of a variable frequency oscillator, forcing it to follow the frequency variation of the limited single sideband signal. The output from the phase-locked loop is a constant-amplitude, narrow band signal, the frequency excursion of which is substantially the same as the frequency excursion of the audio intelligence. The phase-locked loop may include frequency multiplication stages and Class-C amplifiers for processing the output signal from the oscillator to permit maximum efficiency in operation, since no amplitude information is being transmitted.

4 Claims, 4 Drawing Figures

INVENTORS:
ALEX C. LATKER,
JOHANNES J. VANDERGRAAF,
BY J. David Blumenfeld
THEIR ATTORNEY.

INVENTORS:
ALEX C. LATKER,
JOHANNES J. VANDERGRAAF,
BY [signature]
THEIR ATTORNEY.

MODULATION SYSTEM

This application is a continuation of my application, Ser. No. 423,093, filed Jan. 4, 1965 (now abandoned) and entitled "MODULATION SYSTEM," that application also being assigned to the assignee of the instant application.

This invention relates to a method and apparatus for producing a modulated carrier signal which is characterized by the efficient utilization of the frequency spectrum and high transmitter output efficiency.

Transmitting intelligence in the voice or audiofrequency range over a radiofrequency or microwave beam, coaxial cable or the telephone line requires that the intelligence be processed to prepare it for optimum propagation over the chosen transmission medium. Customarily, the intelligence is impressed on a carrier signal of a much higher frequency by modifying or varying (i.e., modulating) some parameter of the carrier signal such as the amplitude, frequency, phase, etc. These varying carrier parameters, representing the intelligence, are detected at the receiver and the intelligence extracted after transmission. The different kinds of modulation are usually identified by the carrier parameter that is varied and include frequency modulation, phase modulation, amplitude modulation, single sideband modulation, double sideband modulation and vestigial sideband modulation, to name just a few of the more prominent ones. Each of these modulation techniques offers certain advantages in the transmission of intelligence and is inevitably accompanied by some corresponding shortcoming.

Thus, one major advantage of frequency modulation systems, which are widely used in the communications industry, is that they are characterized by high transmitter output efficiency. Class C power amplifiers, with their attendant output efficiency, can be used in FM systems since they do not distort the frequency or phase variations of the modulated signal. Since the intelligence of an FM signal is contained in the zero crossings of the carrier wave and any amplitude variations are of no significance and are usually removed by the limiting in the transmitter and receiver, any amplitude distortion, due to Class-C operation of the power amplifier, has no effect, and the system, as a whole, is characterized by high transmitter output efficiencies. Also, FM systems are relatively noise free because of the noise suppression or "noise-quieting" characteristics of frequency modulation. These are substantial advantages and are among the reasons FM is so extensively used in communication. However, it has also long been recognized that FM systems are normally extremely wasteful of the frequency spectrum and require a great deal of bandwidth. This is highly troublesome where the available frequency spectrum is limited. For example, in land mobile radio usage, the channels available for communications are extremely narrow. To produce narrow band FM systems involves the use of special, complicated and expensive circuit arrangements such as preemphasis, limiting, deemphasis, etc. Furthermore, FM systems are subjected to "threshold" effects in which the signal-to-noise ratio of a receiver deteriorates rapidly, and the signal becomes unusable if the noise level exceeds a critical level usually called the threshold. Thus, while an FM system has advantages in terms of output efficiency and relatively noise-free operation above threshold, it has drawbacks in the inefficient use of the frequency spectrum and its susceptibility to threshold effects.

Single sideband modulation systems, on the other hand, are quite economical of bandwidth. However, since some of the modulating intelligence is transmitted in the form of amplitude variations of the single sideband signal, single sideband transmitters have high output linearity requirements (Class-A power amplifiers), and the highly efficient Class-C amplifier operation is unacceptable. Hence, a single sideband system has low transmitter output efficiency. Furthermore, as the lowest significant frequency of the modulating signal is reduced, it becomes increasingly difficult to suppress the carrier and the adjacent portions of the unwanted sideband. For example, if an audio modulating signal from 300 to 3,000 cycles (0.3 kc. → 3 kc.) is utilized, the separation between the unwanted and the wanted sideband is only 600 cycles, and only 300 cycles for any carrier leak, even with the carrier suppressed. The problem of producing narrow band filters with a sharp enough cutoff to suppress the carrier and the unwanted sideband becomes quite formidable, particularly at higher frequencies. For example, if the carrier frequency $f_c$ is 40 megacycles, the upper sideband ($f_c+f_m$) varies between 40.0003 and 40.003 megacycles while the lower sideband ($f_c-f_m$) varies between 39.9997 and 39.997 megacycles. To fabricate a filter which will pass the upper sideband while suppressing the 40 megacycle carrier signal and the lower sideband is at present an insoluble problem. There are no known physically realizable filters that have this sort of discrimination. Hence, it is presently impossible to generate single sideband signals directly at very high frequencies. If the single sideband signal is required at these frequencies, an elaborate sequence of plural modulation steps is required in order to achieve the final frequency. Of course, if there must be a plurality of frequency translations or modulations in order to produce a single sideband signal at the desired frequency level, the complexity, as well as the cost of this system, goes up proportionally.

Hence, a need exists for a modulating system and a transmitter incorporating such a system which is characterized by the high transmitter output efficiency of an FM system and the spectrum economy of a single sideband arrangement.

It is a primary object of this invention to provide a modulating system having high transmitter output efficiency and narrow bandwidth operation.

Another object of this invention is to provide a transmitter for producing a modulated signal having very narrow bandwidth, constant amplitude, and high output efficiency through the use of Class-C power amplifiers.

Still another object of this invention is to provide a communication transmitter for generating a modulated signal having a very narrow bandwidth and high output efficiency which utilizes an active filter device which locks the frequency variation of the signal to be transmitted to the frequency variations of the intelligence signal.

Other objects and advantages of the instant invention will become apparent as the description thereof proceeds.

The various objects and advantages of the instant invention are realized by providing a transmitter which consists of a single sideband signal generator which produces a heavily limited single sideband signal at a relatively low frequency. This limited single sideband signal is applied to a phase-locked output filter loop which includes an output oscillator or exciter. The loop controls the oscillator so that its frequency variations follow the frequency variation of the limited single sideband signal. The modulated signal from the oscillator is then amplified in a Class-C amplifier to provide constant amplitude signals whose position in the frequency domain is varied with respect to a reference carrier frequency. The modulated output signal is continually compared with the frequency of the single sideband signal to generate a control signal which varies the frequency of the transmitter oscillator so that the output frequency follows the frequency variation of the single sideband signal. Hence, a very narrow bandwidth signal is generated in a transmitter which is also highly efficient by virtue of the use of Class-C power amplifiers. As an additional feature of the system, a constant amplitude carrier signal is transmitted during speech pauses only to quiet the receiver during intervals when no intelligence is being transmitted. However, during intervals when intelligence is being transmitted, no carrier is propagated thereby maintaining the overall efficiency of the system.

The novel features, which are believed to be characteristic of this invention, are set forth, with particularity, in the appended claims. The invention itself, however, both as to its organization and mode of operation, together with further objects and advantages, may best be understood by reference to the following description taken in connection with the accompanying drawings in which:

Figure 1:
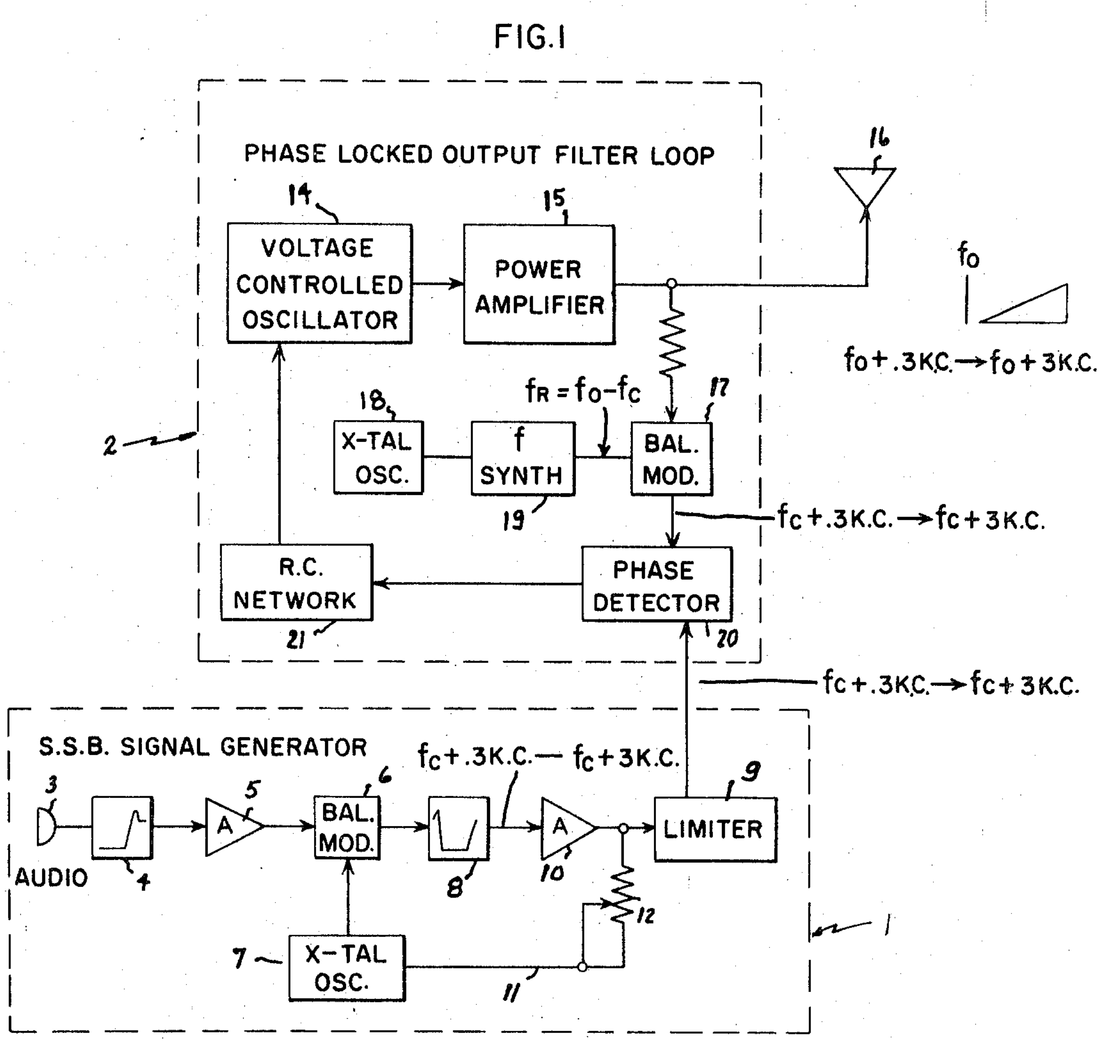
FIG. 1 is a block diagram of the novel transmitter.

FIG. 1 illustrates a transmitter incorporating the novel modulating system of the invention in which high output efficiency is achieved by utilizing a heavily clipped input signal and Class-C-operated power amplifiers. Furthermore, narrow band operation is effected by the utilization of an active output filter which insures that the frequency variation of the output signal follows the frequency variations of the intelligence signal. The transmitter of FIG. 1 is divided into two broad functional blocks, a single sideband signal generator 1 and an output oscillator and phase-locked filter loop 2. The modulating intelligence, such as audio information, for example, is converted in single sideband generator 1 to a single sideband signal and then heavily limited so that essentially all the amplitude variations are removed, and the intelligence is retained only in the frequency variations, i.e., the zero crossings of the single sideband signal. The average power of the transmitted signal is thus substantially increased enhancing the efficiency of any subsequent signal transmission while not materially affecting the quality of the intelligence signal being transmitted, i.e., the audio or speech signal. The limited single sideband signal from generator 1 is applied to the output oscillator and its associated active filter which takes the form of a phase-locked loop. The frequency of the oscillator is varied by the single sideband signal, and the phase-locked filter loop constrains the oscillator to follow the frequency variation of the single sideband signal exactly so that the output from the filter and carrier oscillator is an extremely narrow band signal of constant amplitude. Since the input signal to filter 2 is heavily limited, i.e., any amplitude information in the single sideband signal having been removed, the modulated carrier signal in the filter circuit 2 may be amplified by high-efficiency Class-C amplifiers to further enhance the output efficiency of the entire system since any amplitude distortions introduced by the virtue of the Class-C operation can be ignored and removed by limiting since all of the intelligence information is contained in the frequency variations of the signal. Furthermore, since no carrier or lower sideband signal has been generated, no narrowband filters are required to suppress any unwanted sidebands or signals.

The single sideband signal generator 1, which produces the heavily limited single sideband signal, includes a source of audio intelligence which may be obtained from a microphone 3 or the like. The audio is passed through band-pass filter 4 to limit the audio signal to some convenient frequency band such as 300 to 3,000 cycles per second. The audio signal is amplified in amplifier 5 and applied to a frequency converter such as a balanced modulator along with a carrier signal $f_c$ from crystal controlled carrier oscillator 7. The audio signal is heterodyned in the frequency converting stage to produce upper and lower sidebands, $f_c+(0.3 \rightarrow 3$ kc.) and $f_c-(0.3 \rightarrow 3$ kc.). If a straight mixer is used, a carrier component $f_c$ is also present at the output since, unlike a balanced modulator, a mixer does not suppress the carrier. The upper sideband signal is selected by an upper sideband filter 8 and is applied to a limiter 9 after being amplified in suitable amplifier 10. The carrier signal $f_c$ from oscillator 7 is also introduced into the limiter over line 11 and a potentiometer 12. The relative amplitudes of the prelimited upper sideband signal and the carrier signal $f_c$ are so adjusted that in the absence of voice and the upper sideband, the carrier signal $f_c$ level is sufficient to drive the limiter into full limiting thereby suppressing any background noise. When an upper sideband signal is present, its amplitude is such as to drive the limiter into full limiting and to suppress both the carrier and the background noise. In this manner, the transmitter of FIG. 1 transmits a full carrier during either speech pauses or during intervals when no intelligence is being transmitted at all, which carrier functions to quiet or silence the receiver and suppress the noise at the receiver. During periods when there is audio intelligence present, only the single sideband signal is transmitted so that there is no loss in efficiency by transmitting an unmodulated carrier.

By heavily limiting the single sideband signal, the effective average transmitted power is substantially increased, thereby increasing the output efficiency of the system as a whole. It is well known that the power contained in intelligence, such as speech, varies instantaneously over a wide dynamic range. In fact, in voice transmission, the average person in talking generates a speech signal that has a dynamic range of approximately 30 db. with a peak-to-average ratio of about 10 to 13 db. If the dynamic range of the speech can somehow be compressed, the average power of the signal can be effectively raised. Limiting the audio directly is one possibility. However, limiting the audio signal directly, as opposed to limiting the audio after frequency translation, reduces the degree of compression that can be achieved since the quality of the speech rapidly becomes unintelligible due to harmonic distortion of the fundamental frequencies present in the voice signal. The arrangement shown in FIG. 1 avoids this problem by clipping the signal peaks only after the audio has first been translated to a different portion of the frequency spectrum by means of the balanced modulator or mixer 6.

If the audio is first translated to a higher frequency spectrum (i.e., to a single sideband signal), any degree of limiting, even infinite limiting, does not materially affect the intelligibility of the speech. For purposes of this application, infinite limiting means 30–70 db. or more of limiting. Harmonic distortions of the speech of the clipped single sideband signal is no longer a problem as the harmonics may be easily filtered out in any suitable circuitry, not shown. Furthermore, as will be pointed out presently, the active filter 2, which includes the phase-locked loop, eliminates substantially all of the harmonic distortion that is present. A certain amount of intermodulation distortion is present, but this has no serious effect because (1) subjective listening tests, presently to be described, have shown that the intermodulation distortion is not disturbing to the average listener, and does not affect the intelligibility of the speech. Furthermore, the phase-locked output filter loop 2 also eliminates a substantial portion of any intermodulation distortion produced by the heavy or infinite limiting of the single sideband signal in limiter 9. By thus processing the audio signal, an effective increase in the transmitted power may be achieved which may be anywhere from 8 to 13 db. without at the same time introducing any deleterious effects in terms of distortion and loss of intelligibility.

Heavily limiting the single sideband signal, produced by generator 1, enhances accuracy, stability, and the operational efficiency of the transmitter in one additional way. Phase-locked loop 2 constrains the transmitter oscillator to operate so that its frequency follows the frequency variations of the single sideband signal. This is done by continuously comparing the frequency of the single sideband signal and the frequency of the transmitter output signal in a phase detector. Phase detectors, although theoretically sensitive only to phase variations of the two alternating input signals, are, as a matter of fact, somewhat sensitive to amplitude variations in one of the signals. By clipping the single sideband signal so as to present a constant amplitude single sideband signal to a phase detector, the errors, which might be introduced due to the amplitude variations of one of the input signals, are minimized thus further improving the ability of the transmitter output oscillator to follow the frequency variations of the single sideband signal very closely.

The constant amplitude single sideband signal from limiter 9 ($f_c$+0.3 kc. $\rightarrow$ $f_c$+3 kc.) is applied to the phase-locked loop which includes a voltage controlled oscillator 14 with a nominal system carrier frequency $f_0$. The frequency of the local oscillator is varied by the single sideband signal to produce a corresponding output signal. The output signal from voltage controlled oscillator 14 is amplified in one or more Class-C power amplifiers 15 coupled to antenna 16, and radiated into free space. By operating one or more of the Class-C amplifier stages at saturation, amplitude variations in the oscillator output are removed by a limiting action of the power amplifier to produce a constant amplitude signal, the frequency of which varies in synchronism with the frequency variations of the limited single sideband signal from generator 1. The signal radiated from antenna 16 is, therefore, a constant amplitude signal, the frequency of which varies between $f_0$+0.3 kc. and $f_0$+3 kc. so that the signal might be likened to a constant amplitude single sideband signal. It will be noted, however, that unlike single sideband modulating systems, no carrier component and no lower sideband are simultaneously generated. This eliminates the need for fixed filters to suppress the carrier leak and the unwanted sidebands and all the difficulties normally associated with producing filters with the requisite sharp cutoff characteristics at high frequencies.

The frequency variations of the voltage controlled oscillator 14 are controlled by a loop which constrains its operation and forces it to follow the frequency variations of the single sideband signal as closely as possible and preferably with a one-to-one relationship. To this end, the output from the power amplifier 15 is sampled and applied to a further balanced modulator or mixer 17 where it is mixed or heterodyned with reference signal $f_r$. Furthermore, $f_r$ is made equal to the frequency difference between $f_0$, the system carrier frequency, and $f_c$, the single sideband generator carrier frequency ($f_r$=$f_0$−$f_c$), to convert the transmitter output signal frequency to that of the limited single sideband signal. The reference signal $f_r$ is taken from a source including a crystal oscillator 18 and a frequency synthesizer 19 which may include one or more stages of frequency multiplication. The instantaneous frequency variations of the output from the balanced modulator should correspond exactly to the frequency variations of the limited single sideband signal from the generator 1. The output signal from modulator 17 is applied as one input to a phase detector 20 where it is compared to the single sideband signal. The output from the phase detector is a voltage, the magnitude of which is proportional to the phase magnitude difference between the signals, and the sign of which is proportional to the phase direction difference of the detector input signals. This error voltage is applied through a network 21 as a correction or control voltage to oscillator 14 to force the oscillator to follow the frequency variations of the limited single sideband signal from generator 1.

Network 21 in conjunction with all the elements within the closed loop (i.e., voltage-controlled oscillator 14, power amplifier 15, balanced modulator 17, phase detector 20) is selected so that the loop responds at the proper frequency rate to the limited signal output from limiter 9. It will be obvious to those skilled in the art that some sort of proportionality network is required since any voltage-controlled oscillator incorporated within a closed loop has some predetermined transient characteristic which causes the oscillator to over- or under-correct in terms of frequency when it must follow sudden changes in voltage such as might be present at the output of balanced modulator 17, when rapid changes in frequency are present at the output of limiter 9. Thus, the network may, for example, include an RC integrating network to eliminate the effects of these transients, and it may also include a DC amplifier suitably controlled to produce a desired output control voltage to the oscillator which produces the proper relationship between the oscillator frequency change and the error voltage. It is also obvious to those skilled in the art that the RC network 21 can be chosen such that the closed loop elements 14, 15, 17, 20, and 21 will respond properly over a predetermined frequency rate such as 300 to 3000 cycles per second and not respond to higher frequency rates such as frequencies above 3,000 cycles per second.

In this manner, the closed loop acts as a filter to the incoming frequencies available from limiter 9. The output of limiter 9 will have undesired harmonics of $f_c$ to $f_c$+3 kc. and intermodulation frequencies due to the simultaneous limiting of several frequency components being limited by limiter 9.

As before mentioned, the proper choice of RC network 21 will successfully allow the voltage-controlled oscillator to move at a predetermined rate, for example 300–3,000 cycles per second, and successfully eliminates undesired frequency rates above 3000 cycles per second.

In the system illustrated in FIG. 1, the output frequency of voltage-controlled oscillator 14 is the desired output carrier frequency $f_0$. In some instances, particularly where very high carrier frequencies are desired, it may be useful to have the frequency of oscillator 14 at a lower value and to multiply by one or more frequency-multiplying stages up to the final value of the output carrier $f_0$. In this instance, it will be obvious that frequency output $f_r$ of the frequency synthesizer 19 must be such that $f_r$=$f_0$−$f_c$ as before.

It will also be apparent that in some situations it is not necessary to translate the limited single sideband signal further in the frequency spectrum by utilizing a voltage-controlled oscillator having a nominal carrier frequency $f_0$ which is different than that of the single sideband carrier $f_c$. In that eventuality, of course, the reference carrier signal source, including the crystal oscillator 18 and the frequency synthesizer and modulator 17, may be eliminated and the output sampled and directly compared in phase detector 20. It will be understood that there are many other means and arrangements for producing a transmitter which utilizes the same generic concept, that of comparing the frequency variations of the limited single sideband signal, which represents the intelligence to be transmitted with the frequency variations which the output signals from the transmitter are undergoing to produce an error or control signal representative of any differences which so control the transmitter oscillator that the transmitter frequency variations are constrained to follow the single sideband signal frequency variations.

The voltage-controlled oscillator may be any one of many known types. Thus, for example, tuned circuit feedback oscillators of the Colpitts, Hartley, etc., types may be used. The oscillator includes a voltage-variable capacitor, such as a reverse-biased PN-diode, as part of the frequency-determining tuned circuit. By varying the reverse-biasing voltage applied to the diode, which diodes are sometimes referred to as "varactors", its junction capacitance is varied charging the resonant frequency of the tuned circuit and the oscillator frequency. Alternately, voltage-controlled high-frequency oscillators, such as klystrons and reactance tube modulators may also be used.

It can be seen that a constant-amplitude signal is generated, the frequency of which follows the desired frequency variation of the limited single sideband signal from generator 1 so that the bandwidth occupied by the transmitter output signal is essentially equal to the bandwidth of the voice or modulating signal. Though this output signal may be considered the equivalent of the upper sideband of a single sideband signal, as it occupies the same portion of the frequency domain and the same bandwidth as the single sideband signal, and it may be received and detected in a standard single sideband receiver, it will be noted that the signal is generated without simultaneously generating either a carrier signal or a lower sideband signal. It will also be noted that by substituting a lower sideband filter for filter 8 in the single sideband signal generator 1, and choosing $f_r$=$f_0$−$f_c$ from 19, a lower sideband signal can be also transmitted. Thus, the transmitter differs fundamentally from the basic scheme for generating single sideband signals in that only the frequencies containing the intelligence to be transmitted are generated. A carrier is generated only in the event that no intelligence is being transmitted for, in that eventuality, the output of limiter 9 in the generator 1 is the carrier frequency $f_c$, the output of phase detector 20 is zero and transmitter 14 returns to its nominal frequency $f_0$. The carrier is thus transmitted only in the absence of a modulated signal to minimize or reduce noise.

It will be also be apparent that the phase-lock loop in essence acts as an active filter having a very narrow bandwidth and thereby eliminates or greatly minimizes any harmonic or intermodulation distortion produced in the single sideband generator 1 or by the Class-C power amplifiers coupled between the oscillator and the antenna. This again points out one of the differences between the transmitter arrangement illustrated in FIG. 1 and the standard single sideband-generating scheme in which both an upper and a lower sideband are generated and one of them eliminated by means of a narrow band filter which selects and passes only one of the desired sidebands. It will be apparent, therefore, that the novel transmitter and modulation system realizes the advantages of both frequency modulation and single sideband in that the spectrum economy of single sideband systems is realized without requiring linear operation and the low output efficiency which that entails, while obtaining the advantages of frequency modulation in circuit simplicity, immunity to amplitude noise, and Class-C transmitter output efficiency, without the attendant disadvantages of excessive bandwidth and threshold effects. Furthermore, better spectrum utilization than even narrow band FM is achieved. There are no "threshold" limitations, as in FM, so that the system gain is enhanced or, conversely, adequate communication can be maintained at much lower signal levels than is possible with FM systems.

Figure 4:
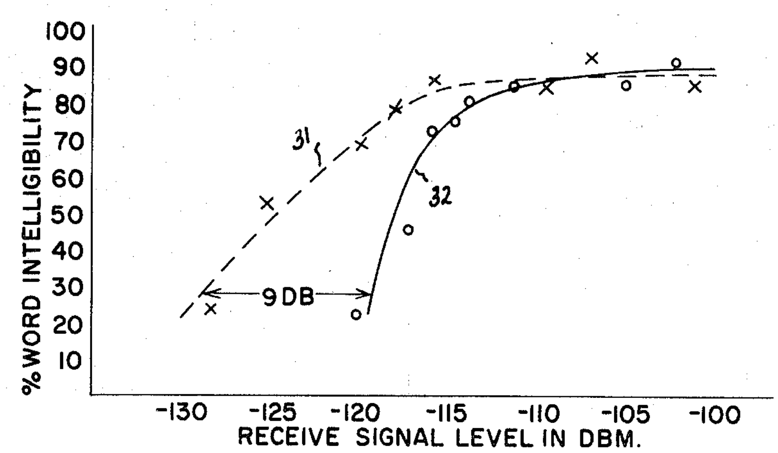
FIGS. 2–4 are a series of graphs illustrating tests and data obtained for the transmitter of FIG. 1.
Figure 3:
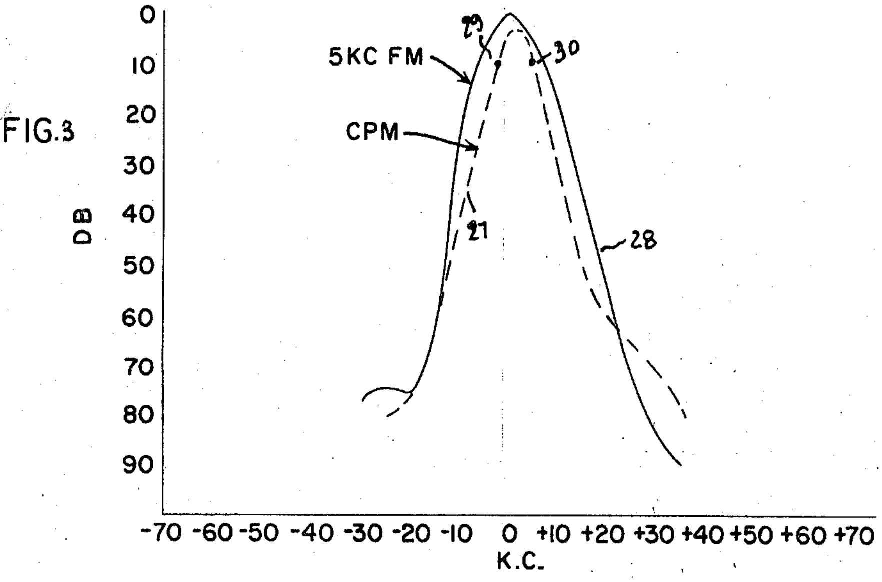
Figure 2:
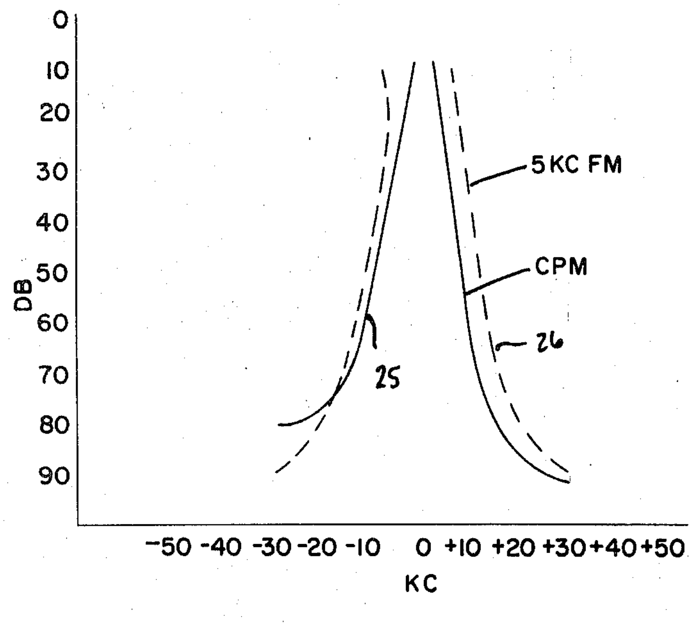

FIGS. 2–3 and 4 are graphic illustrations of a number of tests carried out with a transmitter constructed in accordance with the instant invention which tests illustrate that the instant transmitter achieves at least as good and usually better spectrum efficiency than very narrow band FM, which is close to single sideband spectrum frequency economy, while at the same time achieving the output efficiency of which FM systems are capable. In addition, these tests illustrate that there is additional system gain of 9 db. over narrow band FM in terms of intelligibility, and the system is not subject to the "threshold" effect of FM systems.

Thus, in FIGS. 2 and 3, a transmitter was constructed having a nominal carrier output frequency $f_c$ of 43 megacycles. The transmitter was then modulated with VOSIM (Voice Simulation), and the output spectrum measured with an analyzer having a resolution of 3 kilocycles per second and the results plotted in FIG. 2 as Curve 25. Simultaneously, a narrow band (±5 kilocycles deviation) FM transmitter was modulated with VOSIM and the frequency spectrum of the output measured and plotted as Curve 26. As can be seen, the constant amplitude signal from the transmitter described here occupied a narrower bandwidth than the narrow FM transmitter while at the same time enjoying all of the transmission efficiency of which an FM system is capable.

VOSIM modulation is a standard test common in the communication industry, and the procedure is set forth in EIA Standard RS 152A.

As may be seen from Curve 25, though occupying somewhat more bandwidth than single sideband signal (8 kc. down 20 db.), it is of the same order of magnitude and is less than even a very narrow band FM signal.

In a similar test, the transmitter of the invention and a narrow band FM transmitter were tested by applying two tones at 1 and 3 kc, measuring the output spectrum amplitude with an analyzer. The results are plotted in Curves 27 and 28 for the transmitter of the invention and a narrow band FM system respectively. Again, it may be seen that the constant amplitude single sideband system of the invention is equal to or better than a narrow band FM system. In both curves, the total bandwidth is approximately 18 kc. with the level varying up to about 25 db. It will also be noted that the bandwidth enclosing 99 percent of the transmitter power with two-tone modulation is only 11 kc. as shown in the figure between points 29 and 30. This clearly indicates that the modulation system incorporated and the transmitter illustrated in FIG. 1 have all of the advantages of bandwidth economy as well as the advantages in transmission efficiency.

The weak signal intelligibility of a system of the invention was compared to narrow band FM to determine what advantages existed in the instant system with respect to the threshold problem. FIG. 4 illustrates the result of the tests in which a series of articulation tests were carried out for different input signal levels using the Harvard word lists. The receivers were adjusted for equal noise figures, and six different word lists from the Harvard articulation series were used and some 50 tests were carried out. The percentage of word intelligibility is plotted along the ordinate, and the signal intensity is −dbm. along the abscissa. Curve 29 represents the response to the signal from the transmitter of the invention and Curve 30 for an FM receiver. It is obvious that for signal levels below −116 dbm. the slope of Curve 30 is so steep that intelligibility is very rapidly reduced for even a very small increment of signal loss. This, of course, indicates that the system is operating at or below the "FM Threshold." At 30 percent word intelligibility (which represents 50 percent sentence intelligibility), there is a 9 db. advantage over the FM system. At the 50 percent word intelligibility level (which represents 80 percent sentence intelligibility), there is a 6½ db. improvement over narrowband FM. At 85 percent word intelligibility (97 percent sentence intelligibility), the improvement is still better than 3 db. over the narrow band FM system. This, of course, indicates clearly that (1) the heavy limiting of the single sideband signal of generator 1 does not materially affect the intelligibility of the signal, and (2) that the same degree of intelligibility may be obtained at less power. Thus, the instant modulation system and the transmitter incorporating the same offers a further power saving over narrow band FM in that a weaker signal (by 3–9 db.) produces the same word and sentence intelligibility as that of a narrow band FM system. Thus, the instant system will still maintain communication for weak signals which are below the FM threshold and which are unusable for an FM system.

It will, therefore, be apparent from the description of FIG. 1 and the test results obtained, that a communication transmitter has been provided which provides a given communication capability with a substantial reduction in the input power for the transmitter. Furthermore, a great deal of spectrum economy is achieved which, under certain circumstances, provides a significant reduction in the spacing required between adjacent communication channels in that the bandwidth of the output signal is extremely narrow.

Although a number of specific embodiments of the invention have been shown, it will, of course, be understood that the invention is not limited thereto since many modifications, both in the instrumentality and circuit arrangement employed, may be made. It is contemplated by the appended claims to cover any such modification which falls within the true spirit and scope of this invention.

What is claimed as new and desired to be secured by Letters Patent of the United States is:

1. A narrow band constant-amplitude transmitter for transmitting audio information comprising:

a. a single sideband generator having a first input, a second input and an output;

audio means for communicating a first signal containing said audio information to said first input of said generator;

means for communicating a second signal having a preselected frequency to said second input;

said generator providing at the output thereof a single sideband signal representative of said first signal positioned on one side of said second signal;

b. a limiter having an input and an output;

means for communicating said single sideband signal to the input of said limiter;

said limiter limiting said single sideband signal to generate at the output of said limiter a third signal having a substantially constant amplitude and having frequency variations corresponding to the frequency variations of said single sideband signal;

c. a voltage controlled oscillator having an input and an output, said oscillator generating at the output thereof a fourth signal having a constant amplitude and a second preselected frequency;

d. control means for modifying the frequency of said fourth signal, said control means including:

1. a phase detector having a first input, a second input and an output, means for communicating said third signal to the first input of said detector, means for communicating a sample of said fourth signal to the second input of said detector, network means for providing a communication path from the output of said detector to the input of said oscillator, said phase detector being responsive to instantaneous differences in phase between said third signal and said fourth signal to generate at the output of said detector a DC control signal whose magnitude is proportional to the difference in phase magnitude and whose polarity corresponds to the difference in phase direction between said third signal and said fourth signal, said control signal being applied to said oscillator to modify the frequency of said fourth signal to follow the frequency variations in said third signal;

2. said network means further operating to restrict said DC control signal such that variations in the frequency of said fourth signal are restricted to a range substantially equal to a selected audio band pass;

e. output terminals, and output means communicating said fourth signal to said output terminals.

2. The transmitter of claim 1 including:

means for applying a sample of said second signal to the input of said limiter, said sample of said second signal being of just great enough amplitude to cause said limiter to generate said third signal at the frequency of said second signal when said single sideband signal is not present at the input of said limiter.

3. A narrow band constant-amplitude transmitter for transmitting audio information comprising:

a. a single sideband generator having a first input, a second input and an output;

audio means for communicating a first signal containing said audio information to said first input of said generator;

means for communicating a second signal having a preselected frequency to said second input;

said generator providing at the output thereof a single sideband signal representative of said first signal positioned on one side of said second signal;

b. a limiter having an input and an output;

means for communicating said single sideband signal to the input of said limiter;

said limiter limiting said single sideband signal to generate at the output of said limiter a third signal having a substantially constant amplitude and having frequency variations corresponding to the frequency variations of said single sideband signal;

c. a voltage controlled oscillator having an input and an output, said oscillator generating at the output thereof a fourth signal having a constant amplitude and a second preselected frequency;

d. control means for modifying the frequency of said fourth signal, said control means including:

1. a source of a reference signal having a constant frequency equal to the difference between the frequency of said fourth signal when not varied by said control means and the frequency of said second signal;

2. a balanced modulator having a first input, a second input and an output, means for communicating said reference signal to the first input of said modulator, means for communicating a sample of said fourth signal to the second input of said modulator, said modulator being responsive to said reference signal and said fourth signal to generate a fifth signal at the output of said modulator equal in frequency to the instantaneous frequency difference between said reference signal and said fourth signal;

3. a phase detector having a first input, a second input and an output, means for communicating said third signal to the first input of said detector, means for communicating said fifth signal to the second input of said detector, network means for providing a communication path from the output of said detector to the input of said oscillator, said phase detector being responsive to instantaneous differences in phase between said third signal and said fifth signal to generate at the output of said detector a DC control signal whose magnitude is proportional to the difference in phase magnitude and whose polarity corresponds to the difference in phase direction between said third signal and said fifth signal, said control signal being applied to said oscillator to modify the frequency of said fourth signal to follow the frequency variations in said third signal;

4. said network means further operating to restrict said DC control signal such that variations in the frequency of said fourth signal are restricted to a range substantially equal to a selected audio band pass;

e. output terminals, and output means communicating said fourth signal to said output terminals.

4. The transmitter of claim 3 including:

means for applying a sample of said second signal to the input of said limiter, said sample of said second signal being of just great enough amplitude to cause said limiter to generate said third signal at the frequency of said second signal when said single sideband signal is not present at the input of said limiter.

* * * * *

UNITED STATES PATENT OFFICE
CERTIFICATE OF CORRECTION

Patent No. 3,644,831 Dated February 22, 1972

Inventor(s) A.C. Latker, J.J. Vandegraaf

It is certified that error appears in the above-identified patent and that said Letters Patent are hereby corrected as shown below:

Column 6, line 56, change from "$f_r=f_o-f_c$" to -- $f_r=f_o+f_c$ --

Signed and sealed this 27th day of March 1973.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P69
☆ U.S. GOVERNMENT PRINTING OFFICE : 1969 O—366-334